(12) United States Patent
Bae et al.

(10) Patent No.: US 10,900,671 B2
(45) Date of Patent: Jan. 26, 2021

(54) SLIM-TYPE AIR PROCESSING DEVICE (71) Applicant: COWAY CO., LTD., Chungcheongnam-do (KR)

(72) Inventors: Jun-Hyoung Bae, Seoul (KR); Sang-Woo Kang, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 309 days.

(21) Appl. No.: 15/749,134

(22) PCT Filed: Jul. 22, 2016

(86) PCT No.: PCT/KR2016/008023
§ 371 (c)(1),
(2) Date: Jan. 31, 2018

(87) PCT Pub. No.: WO2017/022989
PCT Pub. Date: Feb. 9, 2017

(65) Prior Publication Data
US 2018/0224134 A1    Aug. 9, 2018

(30) Foreign Application Priority Data

Jul. 31, 2015 (KR) .................. 10-2015-0109047
Mar. 2, 2016 (KR) .................. 10-2016-0024893

(51) Int. Cl.
*F24F 1/0022* (2019.01)
*B01D 46/00* (2006.01)
(Continued)

(52) U.S. Cl.
CPC .......... *F24F 1/0022* (2013.01); *B01D 46/002* (2013.01); *F24F 1/02* (2013.01);
(Continued)

(58) Field of Classification Search
CPC . B01D 46/002; B01D 46/0021; F24F 1/0022; F24F 11/72; F24F 1/02; F24F 11/0001
See application file for complete search history.

(56) References Cited

U.S. PATENT DOCUMENTS 8,034,169 B2 * 10/2011 Yamashita ............ F24F 3/1603
96/245
2007/0066215 A1 * 3/2007 Song .................. B01D 46/0038
454/329
(Continued)

FOREIGN PATENT DOCUMENTS

CN         1470807        1/2004
CN         1842374        10/2006
(Continued)

OTHER PUBLICATIONS

"Double Inlet, Higher volume centrifugal fans" by Airflow Developments Limited, airflow.com Jun. 2017 (Year: 2007).*
(Continued)

*Primary Examiner* — Robert Clemente
(74) *Attorney, Agent, or Firm* — Dority & Manning, P.A.

(57) ABSTRACT

Disclosed is a slim-type air processing device adopting a centrifugal fan which is capable of air suction on both sides of the device. The disclosed slim-type air processing device comprises: a housing; a centrifugal fan provided inside the housing; an air suction part which is formed in the housing and is provided in the radial direction of the centrifugal fan; and an air processing part which is mounted in the housing, is disposed on a flow path of air flowing from the air suction part to the centrifugal fan, and processes air passing therethrough in a manner of at least one of dehumidification, humidification, and purification. According to the slim-type air processing device, it is possible to efficiently use the
(Continued)

entire area of a filter, and to obtain an effect in which the device has a smaller size and has an improved design.

11 Claims, 10 Drawing Sheets

(51) Int. Cl.
| | |
|---|---|
| *F24F 3/14* | (2006.01) |
| *F24F 13/10* | (2006.01) |
| *F24F 3/16* | (2006.01) |
| *F24F 11/72* | (2018.01) |
| *F24F 11/63* | (2018.01) |
| *F24F 1/02* | (2019.01) |
| *F24F 6/00* | (2006.01) |
| *F24F 11/00* | (2018.01) |
| *F24F 13/28* | (2006.01) |
| *F24F 110/64* | (2018.01) |
| *F24F 110/00* | (2018.01) |
| *F24F 110/52* | (2018.01) |
| *F24F 110/65* | (2018.01) |

(52) U.S. Cl.
CPC .............. *F24F 3/14* (2013.01); *F24F 3/1603* (2013.01); *F24F 6/00* (2013.01); *F24F 11/0001* (2013.01); *F24F 11/63* (2018.01); *F24F 11/72* (2018.01); *F24F 13/10* (2013.01); *F24F 13/28* (2013.01); *F24F 2003/1689* (2013.01); *F24F 2011/0002* (2013.01); *F24F 2110/00* (2018.01); *F24F 2110/52* (2018.01); *F24F 2110/64* (2018.01); *F24F 2110/65* (2018.01)

(56) References Cited

U.S. PATENT DOCUMENTS

| | | |
|---|---|---|
| 2008/0163754 A1 | 7/2008 | Tanaka et al. |
| 2012/0048792 A1 | 3/2012 | Saitou et al. |
| 2012/0085927 A1 | 4/2012 | Maeng et al. |
| 2015/0306533 A1* | 10/2015 | Matlin .................... F24F 11/30 96/420 |
| 2017/0045245 A1 | 2/2017 | Nam et al. |

FOREIGN PATENT DOCUMENTS

| | | | |
|---|---|---|---|
| CN | 202254128 | | 5/2012 |
| CN | 102721137 | | 10/2012 |
| CN | 103712286 | * | 4/2014 |
| DE | 20319353 | | 3/2004 |
| EP | 1980317 | | 10/2008 |
| EP | 2093506 | | 8/2009 |
| JP | 2006105408 A | * | 4/2006 |
| JP | 2012137205 A | * | 7/2012 |
| KR | 20040056138 | | 6/2004 |
| KR | 20070023398 | | 2/2007 |
| KR | 20070078255 | | 7/2007 |
| KR | 20100061114 | | 6/2010 |
| KR | 20150077776 | | 7/2015 |
| WO | WO2014020246 A1 | * | 2/2014 |
| WO | WO2015099296 | | 7/2015 |
| WO | WO2019107162 A1 | * | 6/2019 |

OTHER PUBLICATIONS

International Search Report for PCT/KR2016/008023, dated Oct. 19, 2016, 4 pages.

* cited by examiner

SLIM-TYPE AIR PROCESSING DEVICE

TECHNICAL FIELD

The present disclosure relates to a slim-type air processing device, and more specifically, to a slim-type air processing device in which a centrifugal fan capable of air suction on both sides of the device is adopted.

BACKGROUND ART

Various air processing devices (a humidifier, a dehumidifier, an air purifier, an air cleaning dehumidifier, an air cleaning humidifier, and the like) installed indoors to create a pleasant indoor environment and dehumidifying, humidifying, and/or purifying indoor air are widely used in domestic and commercial settings.

In recent years, in order to improve the performance of such an air processing device, many products manufactured to suck air to both sides of the device for the purpose of increasing the airflow of the device have been developed.

Meanwhile, in a double suction type air processing device according to the related art, in order to suck air through a front surface and a rear surface of a double suction fan installed inside a device, air inlets are provided in a front surface and a rear surface of the device, and filters are disposed in the front surface and the rear surface of the double suction fan, in general.

However, in the double suction type air processing device according to the related art, an inlet of a double suction fan, a filter, and an air inlet are arranged in a straight line, so a deviation in an air flow rate between a region of the filter, opposing a front surface of the inlet of the double suction fan, and other regions, may be significant. Thus, the double suction type air processing device has the disadvantage of not efficiently using an entire area of a filter.

In addition, in the double suction type air processing device according to the related art, filters for processing air are disposed to the front and to the rear of the double suction fan. Thus, the double suction type air processing device has the disadvantage of increasing an overall length of the device.

In addition, in the double suction type air processing device according to the related art, when the device is disposed to be adjacent to an indoor wall, due to a narrow space between an air inlet in a rear surface and a wall, the double suction type air processing device has the disadvantage of having reduced air suction efficiency in the air inlet in the rear surface.

DISCLOSURE

Technical Problem

The present disclosure is realized by recognizing at least one of the problems occurring in the related art. An aspect of the present disclosure may provide a slim-type air processing device capable of efficiently using an entire area of a filter, having a reduced size, and having an improved design.

Technical Solution

According to an aspect of the present disclosure, a slim-type air processing device includes: a housing; a centrifugal fan provided inside the housing; an air suction part formed in the housing, and provided in a radial direction of the centrifugal fan; and an air processing part mounted in the housing, disposed on a flow path of air flowing from the air suction part to the centrifugal fan, and processing air, passing therethrough, in a manner of at least one of dehumidification, humidification, and purification.

In an exemplary embodiment, the centrifugal fan may be provided with a shaft parallel to a front-rear direction of the housing, and the air suction part and the air processing part may be provided on both sides of the housing.

In an exemplary embodiment, an empty space may be formed between an inlet of the centrifugal fan and an inner wall of the housing opposing the inlet.

In an exemplary embodiment, the air processing part may include an air purification filter.

In an exemplary embodiment, the centrifugal fan may be configured to draw in air on both sides.

In an exemplary embodiment, an upper end of the housing may be provided with an air discharge part from which air inside of the housing is discharged externally.

In another exemplary embodiment, the centrifugal fan may include a first inlet disposed toward a front surface of the housing and a second inlet disposed toward a rear surface of the housing, the air suction part may include a first air suction part formed in one side of the housing, and a second air suction part formed in the other side of the housing, and an interior of the housing may be provided with a first flow path connected between the first air suction part and the first inlet, a second flow path connected between the first air suction part and the second inlet, a third flow path connected between the second air suction part and the first inlet, and a fourth flow path connected between the second air suction part and the second inlet.

The slim-type air processing device according to another exemplary embodiment may further include: a first opening and closing part provided in the housing so as to open and close the first flow path; a second opening and closing part provided in the housing so as to open and close the second flow path; a third opening and closing part provided in the housing so as to open and close the third flow path; and a fourth opening and closing part provided in the housing so as to open and close the fourth flow path.

Here, the air processing part may include a first filter disposed in the first air suction part and purifying air, and a second filter disposed in the second air suction part and purifying air, and the first filter and the second filter may have different air purification functions.

The first filter may include a deodorizing filter removing an odor in air, and the second filter may include a high efficiency particulate air (HEPA) filter removing fine dust and bacteria in air.

The slim-type air processing device according to another exemplary embodiment may further include: a gas sensor for sensing a gas concentration of air outside of the housing; a dust sensor for sensing a dust concentration of air outside of the housing; and a control part for controlling a flow path opening and closing operation of the first opening and closing part, the second opening and closing part, the third opening and closing part, and the fourth opening and closing part, based on a value sensed by the gas sensor and the dust sensor.

Here, the control part may allow the first opening and closing part and the second opening and closing part to be opened when a gas concentration, sensed by the gas sensor, is equal to or greater than a reference value, and may allow the third opening and closing part and the fourth opening and closing part to be opened when a dust concentration, sensed by the dust sensor, is equal to or greater than a reference value.

In another exemplary embodiment, the control part may allow the first opening and closing part and the second opening and closing part to be closed when the gas concentration, sensed by the gas sensor, is lower than the reference value, and may allow the third opening and closing part and the fourth opening and closing part to be closed when the dust concentration, sensed by the dust sensor, is lower than the reference value.

In another exemplary embodiment, the control part may allow the first opening and closing part and the second opening and closing part to be opened and the third opening and closing part and the fourth opening and closing part to be closed, when the gas concentration, sensed by the gas sensor, is equal to or greater than a preset risk value, and may allow the first opening and closing part and the second opening and closing part to be closed and the third opening and closing part and the fourth opening and closing part to be opened, when the dust concentration, sensed by the dust sensor, is equal to or greater than a preset risk value.

Advantageous Effects

According to an exemplary embodiment in the present disclosure, an entire area of a filter may be efficiently used, and a device may have a reduced size and an improved design.

According to an exemplary embodiment in the present disclosure, even when one of an air suction part included in both sides of a device is blocked, suction performance of both sides of a double suction centrifugal fan may be exhibited fully, without a decrease in an air volume.

According to an exemplary embodiment in the present disclosure, filters having different air purification functions are disposed in respective air suction parts, included in both sides of a device, and opening and closing of an air flow path in which the filters having different air purification functions are disposed are controlled. Thus, a function among the different air purification functions is selected as required, so the function may be intensively performed.

BEST MODE FOR INVENTION

Hereinafter, preferred embodiments of the present disclosure will be described with reference to the accompanying drawings. However, the embodiments of the present disclosure may be modified to have various other forms, and the scope of the present disclosure is not limited to the embodiments described below. Moreover, the embodiments of the present disclosure are also provided to more fully describe the present disclosure to those skilled in the art. The shapes and sizes of components in the drawings may be exaggerated for clarity.

Hereinafter, preferable exemplary embodiments will be described with reference to the accompanying drawings.

Referring to FIGS. 1 through 5, a slim-type air processing device according to an exemplary embodiment will be described. As illustrated in FIGS. 1 through 5, a slim-type air processing device 100 according to an exemplary embodiment may include a housing 110, a centrifugal fan 120, a first air suction part 115a, a second air suction part 115b, an air discharge part 116, and an air processing part 130.

The housing 110 may form an outer cover of the slim-type air processing device 100 according to an exemplary embodiment, and may have an internal space in which various components may be installed, such as the centrifugal fan 120, the air processing part 130, and the like, to be described hereinafter.

Figure 1:
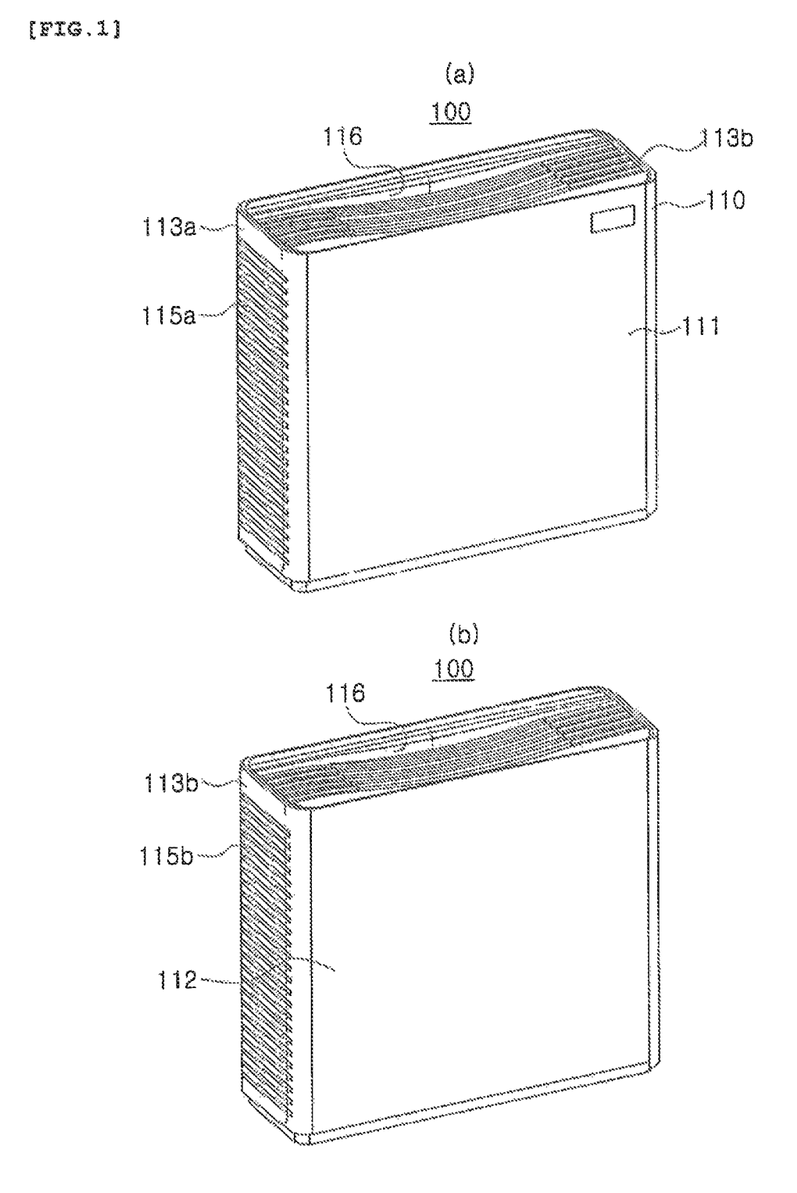
FIGS. 1A and 1B are a front perspective view and a rear perspective view of a slim-type air processing device according to an exemplary embodiment.
Figure 2:
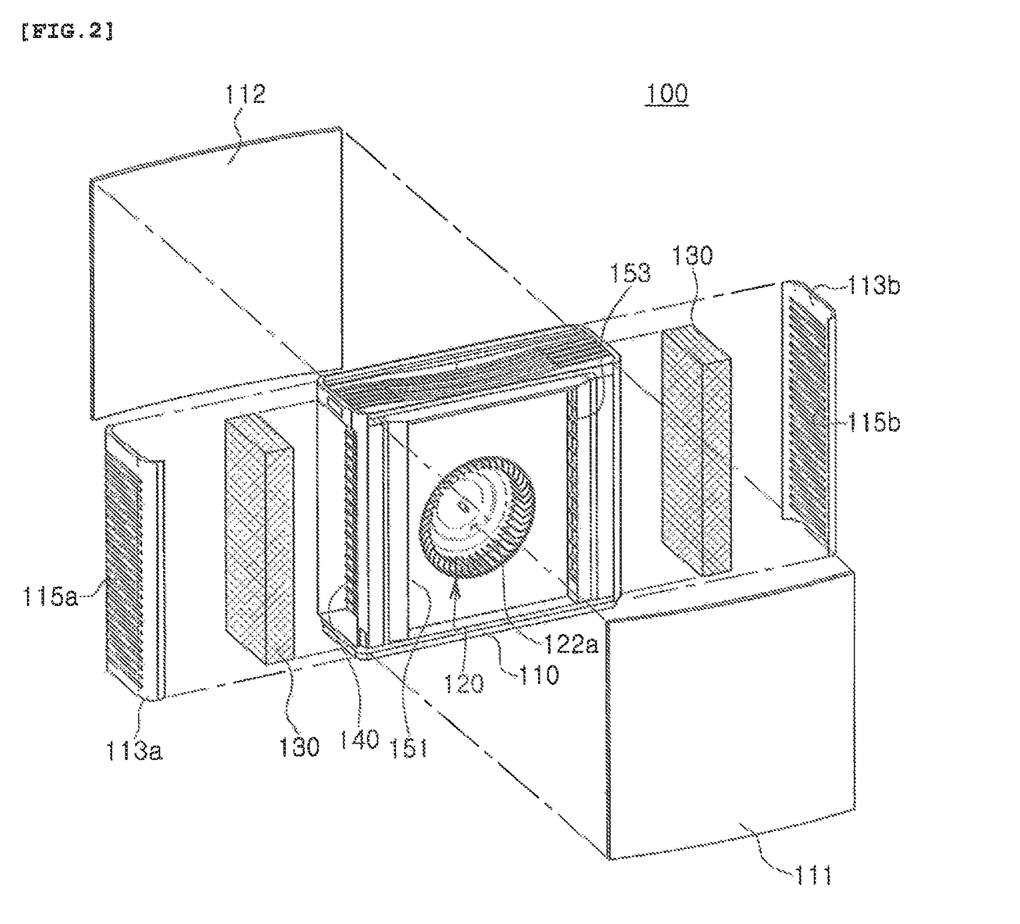
FIG. 2 is a front exploded perspective view in which a front surface cover, a rear surface cover, a filter cover, and an air processing part of the slim-type air processing device illustrated in FIG. 1 are disassembled.
Figure 3:
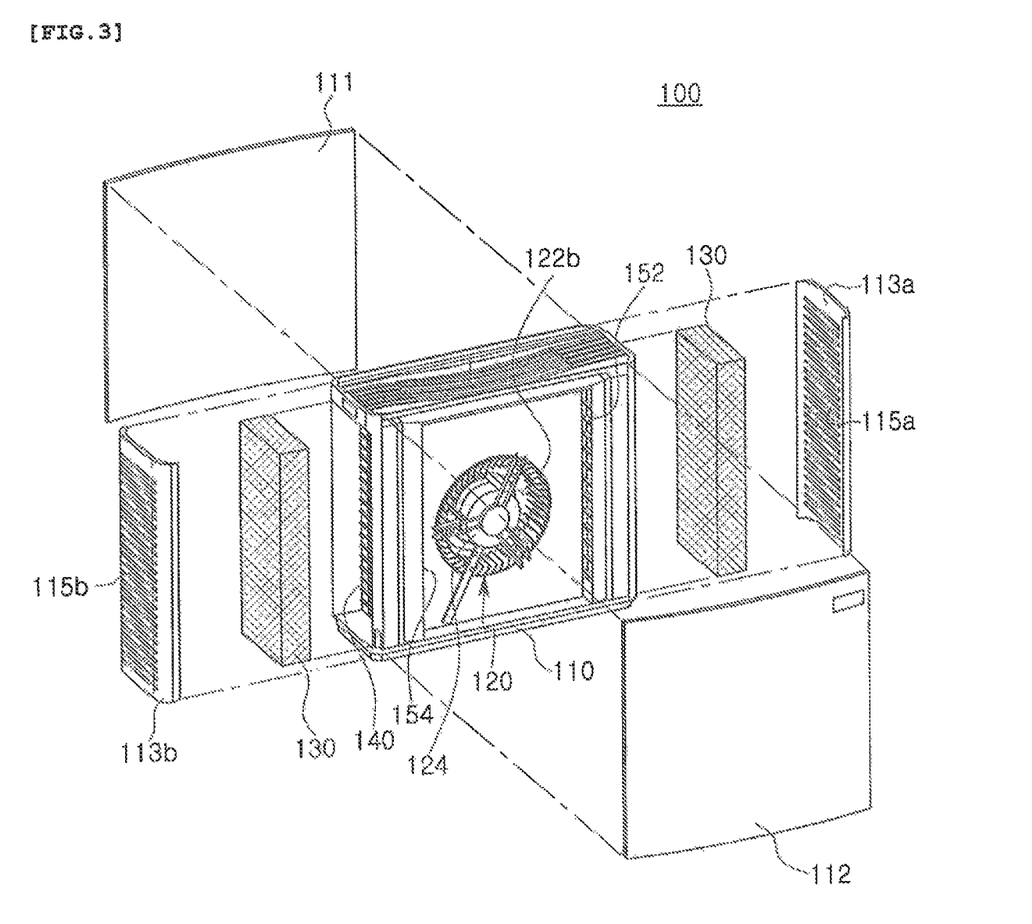
FIG. 3 is a rear exploded perspective view in which a front surface cover, a rear surface cover, a filter cover, and an air processing part of the slim-type air processing device illustrated in FIG. 1 are disassembled.

In an exemplary embodiment, the housing 110 may be configured to include a front surface cover 111, a rear surface cover 112, a first filter cover 113a, and a second filter cover 113b.

The front surface cover 111 is disposed in a front surface of the housing 110 and may cover one side of the centrifugal fan 120 such that one side of the centrifugal fan 120, to be described hereinafter, is not exposed externally.

In addition, the rear surface cover 112 is disposed on a rear surface of the housing 110 and may cover the other side of the centrifugal fan 120 such that the other side of the centrifugal fan 120, to be described hereinafter, is not exposed externally.

In addition, the first filter cover 113a may be provided on one side of the housing 110, as a member provided to be detachably mounted on the housing 110 so as to cover the air processing part 130 to be described hereinafter and which is mounted in one side of the housing 110.

The first filter cover 113a may have the first air suction part 115a to be described hereinafter and through which air may pass.

Moreover, the second filter cover 113b may be provided in the other side of the housing 110, as a member provided to be detachably mounted on the housing 110 so as to cover the air processing part 130 to be described hereinafter and which is mounted in the other side of the housing 110.

The second filter cover 113b may have the second air suction part 115b through which air may pass.

In an exemplary embodiment, the first filter cover 113a and the second filter cover 113b may have substantially the same form, but is not limited thereto.

The centrifugal fan 120 is provided in the housing 110, and may generate air flow so as to allow external air to be sucked into an interior of the housing 110 through the first air suction part 115a and the second air suction part 115b, to be described hereinafter, and, thereafter, to discharge the air to the air discharge part 116, to be described hereinafter, again.

The centrifugal fan 120 sucks air in a shaft direction and discharges the air in a circumferential direction. Here, the centrifugal fan 120 may include a scroll casing 126 guiding the air, discharged in the circumferential direction, to the air discharge part 116 to be described hereinafter.

In an exemplary embodiment, the centrifugal fan 120 may be provided with a shaft parallel to a front-rear direction of the housing 110.

In addition, in an exemplary embodiment, the centrifugal fan 120 may be configured as a double suction type, capable of sucking air on both sides. In this case, on both sides of the centrifugal fan 120, a first inlet 122a and a second inlet 122b, in which air is sucked, may be provided.

As described above, when the shaft is disposed to be parallel to a front-rear direction of the housing 110, the first inlet 122a of the centrifugal fan 120 may oppose an inner side surface of the front surface cover 111, while the second inlet 122b of the centrifugal fan 120 may oppose an inner side surface of the rear surface cover 112.

For example, the second inlet 122b may have a drive motor 124 for driving the centrifugal fan 120.

Figure 5:
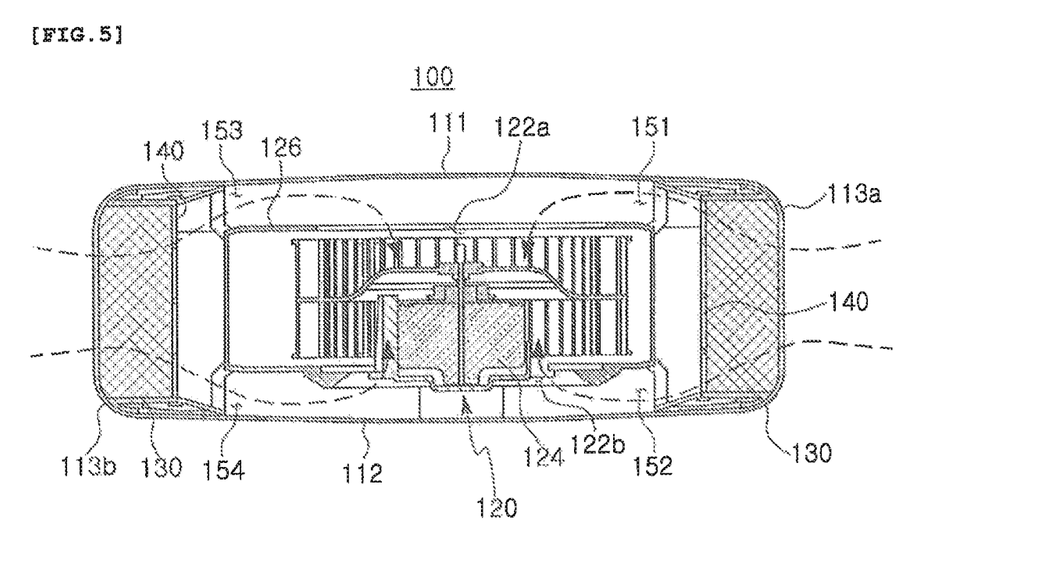
FIG. 5 is a plan cross-sectional view of the slim-type air processing device illustrated in FIG. 1.

Meanwhile, in an exemplary embodiment, empty spaces may be formed between the first inlet 122a and an inner side surface of the front surface cover 111 and between the second inlet 122b and an inner side surface of the rear surface cover 112.

In other words, in a gap between the first inlet 122a of the centrifugal fan 120 and the front surface cover 111 and in a gap between the second inlet 122b of the centrifugal fan 120 and the rear surface cover 112, minimum flow paths, in which air is able to flow toward the first inlet 122a and the second inlet 122b, may be secured.

By means of a structure described above, the slim-type air processing device 100 according to an exemplary embodiment may have the advantage in which a device has a reduced size. In detail, the slim-type air processing device may have the advantage in which a length in a front-rear direction of a device is reduced.

Meanwhile, the empty spaces provided between the first inlet 122a and the inner side surface of the front surface cover 111 and between the second inlet 122b and the inner side surface of the rear surface cover 112 may provide a flow path in which air passing through the air processing part 130 to be described hereinafter flows into the centrifugal fan 120.

As illustrated in FIG. 5, the flow path described above may be divided into a first flow path 151 connected between the first air suction part 115a and the first inlet 122a, a second flow path 152 connected between the first air suction part 115a and the second inlet 122b, a third flow path 153 connected between the second air suction part 115b and the first inlet 122a, and a fourth flow path 154 connected between the second air suction part 115b and the second inlet 122b.

The first air suction part 115a and the second air suction part 115b may be formed in the housing 110 and may be provided in a radial direction of the centrifugal fan 120, as paths in which external air flows into an interior of the housing 110.

In other words, the first air suction part 115a and the second air suction part 115b may be provided to be spaced apart from the centrifugal fan 120 on an extension line in a radial direction of the centrifugal fan 120.

In an exemplary embodiment, when the shaft of the centrifugal fan 120 is installed to be arranged parallel to a front-rear direction of the housing 110, the first air suction part 115a and the second air suction part 115b may be provided on both sides or upper and lower ends of the housing 110.

Here, a structure in which at least one of the first air suction part 115a and the second air suction part 115b is provided in a lower end of the housing 110 has the disadvantage in which air may not be smoothly sucked through the first air suction part 115a and the second air suction part 115b, provided in the lower end of the housing 110, when a device stands on a bottom. Moreover, a structure in which the first air suction part 115a and the second air suction part 115b are provided in an upper end and one side of both sides of the housing 110 has the disadvantage in which a region of the first inlet 122a and the second inlet 122b of the centrifugal fan 120, for sucking air, is biased toward a portion, so suction efficiency compared to area, of the first inlet 122a and the second inlet 122b, may be low.

Thus, in an exemplary embodiment, the first air suction part 115a and the second air suction part 115b are preferably provided on both sides of the housing 110.

By means of a structure described above, the slim-type air processing device 100 according to an exemplary embodiment may suck air on both sides rather than through front and rear surfaces.

The air discharge part 116 forms a path in which air inside of the housing 110 is discharged externally by an operation of the centrifugal fan 120.

As described previously, when the first air suction part 115a and the second air suction part 115b are provided on both sides of the housing 110, the air discharge part 116 may be provided in an upper end of the housing 110, but is not limited thereto. Alternatively, the air discharge part may be provided in a front surface or a rear surface of the housing 110.

The air processing part 130 is mounted on the housing 110, and may be disposed on a flow path of air flowing from the air suction part 115 to the centrifugal fan 120 and may process the air.

Here, processing air means that air passing therethrough is processed in a manner of at least one of dehumidification, humidification, and purification To this end, the air processing part 130 may be configured to include at least one of a dehumidification unit, a humidification unit, and an air purification filter.

For reference, in FIGS. 2 through 5, an exemplary embodiment, in which the air processing part 130 includes an air purification filter, is disclosed.

When the air processing part 130 includes the air purification filter, filter frames 140, on which an air purification filter may be mounted, may be provided on both sides of the housing 110.

In addition, the air purification filter may include a plurality of filters having different filtering functions.

For example, the air purification filter may be configured to include a microfiber pre-filter, an antibacterial filter, a deodorization filter, a HEPA filter, and the like.

Meanwhile, in an exemplary embodiment, air processing parts 130 may be provided on both sides of the housing 110 to correspond to the first air suction part 115a and the second air suction part 115b provided on both sides of the housing 110.

Figure 4:
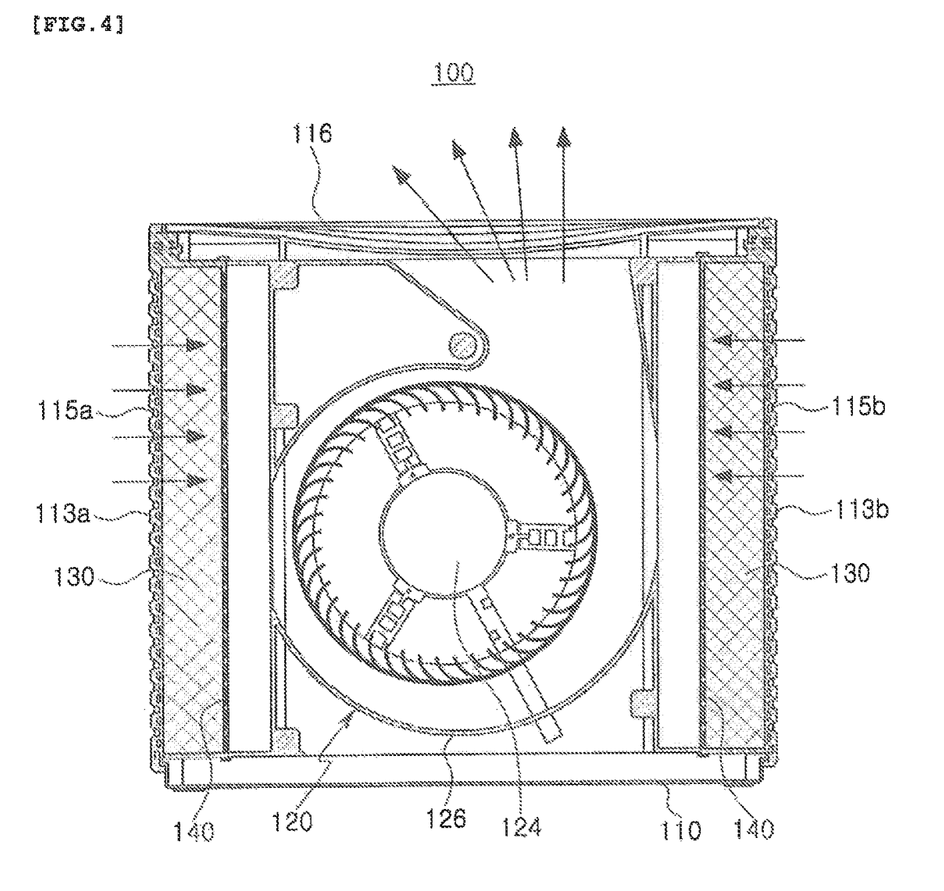
FIG. 4 is a front cross-sectional view of the slim-type air processing device illustrated in FIG. 1.

In a configuration described above, when the centrifugal fan 120 is operated, as illustrated in FIGS. 4 and 5, air is sucked through the first air suction part 115a and the second air suction part 115b, and passes through the air processing part 130 to be processed. Thereafter, the air is sucked into the first inlet 122a and the second inlet 122b of the centrifugal fan 120, and may be discharged indoors through the air discharge part 116 provided on an upper end of the housing 110.

The slim-type air processing device 100 according to an exemplary embodiment as described previously has the advantage in which a filter is disposed on a side surface rather than on a front surface of the first inlet 122a and the second inlet 122b of the centrifugal fan 120, so air is allowed to pass through an entire area of the filter in a balanced manner and the use efficiency of the filter is improved.

In addition, the slim-type air processing device 100 according to an exemplary embodiment has the advantages in which a length of a device may be reduced, so a device has a reduced size, and a grill structure for air suction is not formed in a front surface and a rear surface, so a device has an improved design.

In addition, the slim-type air processing device 100 according to an exemplary embodiment the advantage in which air may be sucked into a side surface. In this case, even when a device is installed to be adjacent to a wall, air may be smoothly sucked, so constraints of an installation place may be alleviated.

Next, referring to FIGS. 6 through 11, a slim-type air processing device 100-1 according to another exemplary embodiment will be described.

As illustrated in FIGS. 6 through 11, the slim-type air processing device 100-1 according to another exemplary embodiment may include a first flow path 151, a second flow path 152, a third flow path 153, and a fourth flow path 154 inside of a housing 110, and may include a first opening and closing part 161, a second opening and closing part 162, a third opening and closing part 163, and a fourth opening and closing part 164, opening and closing the first flow path 151, the second flow path 152, the third flow path 153, and the fourth flow path 154, respectively.

Here, the first flow path 151 is connected between the first air suction part 115a and the first inlet 122a of the centrifugal fan 120, the second flow path 152 is connected between the first air suction part 115a and the second inlet 122b of the centrifugal fan 120, and the third flow path 153 is connected between the second air suction part 115b and the first inlet 122a of the centrifugal fan 120. Moreover, the fourth flow path 154 is connected between the second air suction part 115b and the second inlet 122b of the centrifugal fan 120.

Figure 8:
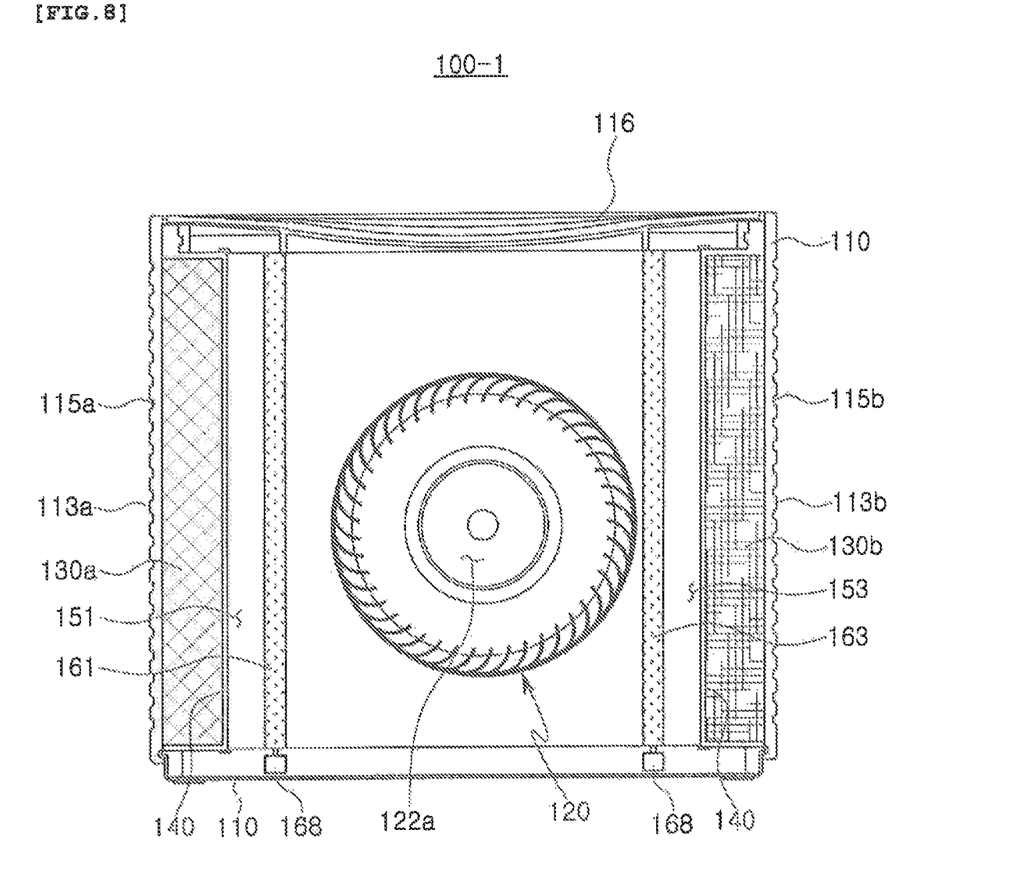
FIG. 8 is a view illustrating a first opening and closing part and a second opening and closing part included in the slim-type air processing device illustrated in FIG. 6.
Figure 9:
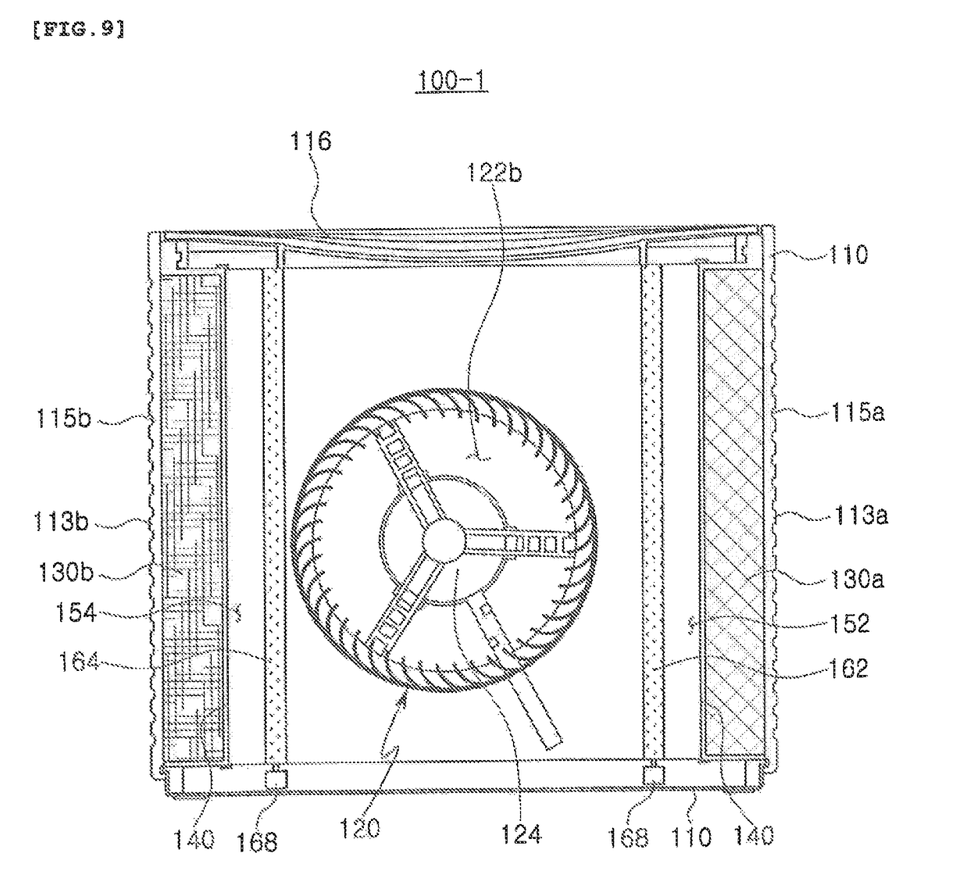
FIG. 9 is a view illustrating a second opening and closing part and a fourth opening and closing part included in the slim-type air processing device illustrated in FIG. 6.

In addition, the first opening and closing part 161 may be provided in the first flow path 151 and may allow the first flow path 151 to be opened and closed, while the second opening and closing part 162 may be provided in the second flow path 152 and may allow the second flow path 152 to be opened and closed. Moreover, the third opening and closing part 163 may be provided in the third flow path 153 and may allow the third flow path 153 to be opened and closed, while the fourth opening and closing part 164 may be provided in the fourth flow path 154 and may allow the fourth flow path 154 to be opened and closed.

In other words, the first opening and closing part 161, the second opening and closing part 162, the third opening and closing part 163, and the fourth opening and closing part 164 may allow a path, in which air, flowing into an interior of the housing 110 through the first air suction part 115a or the second air suction part 115b, flows to the first inlet 122a or the second inlet 122b of the centrifugal fan 120, to be selectively shielded.

In an exemplary embodiment, each of the first opening and closing part 161, the second opening and closing part 162, the third opening and closing part 163, and the fourth opening and closing part 164 may independently perform a flow path opening and closing operation.

To implement an operation described above, in an exemplary embodiment, the first opening and closing part 161, the second opening and closing part 162, the third opening and closing part 163, and the fourth opening and closing part 164 are formed to have a width and a height, capable of airtightly shielding the first flow path 151, the second flow path 152, the third flow path 153, and the fourth flow path 154, and may include a plate-shaped member to be rotated in an air flow direction and in an air flow reverse direction in respective flow paths. Here, in the first opening and closing part 161, the second opening and closing part 162, the third opening and closing part 163, and the fourth opening and closing part 164, a rotation angle may be adjusted by a motor member 168 provided in the housing 110.

Figure 6:
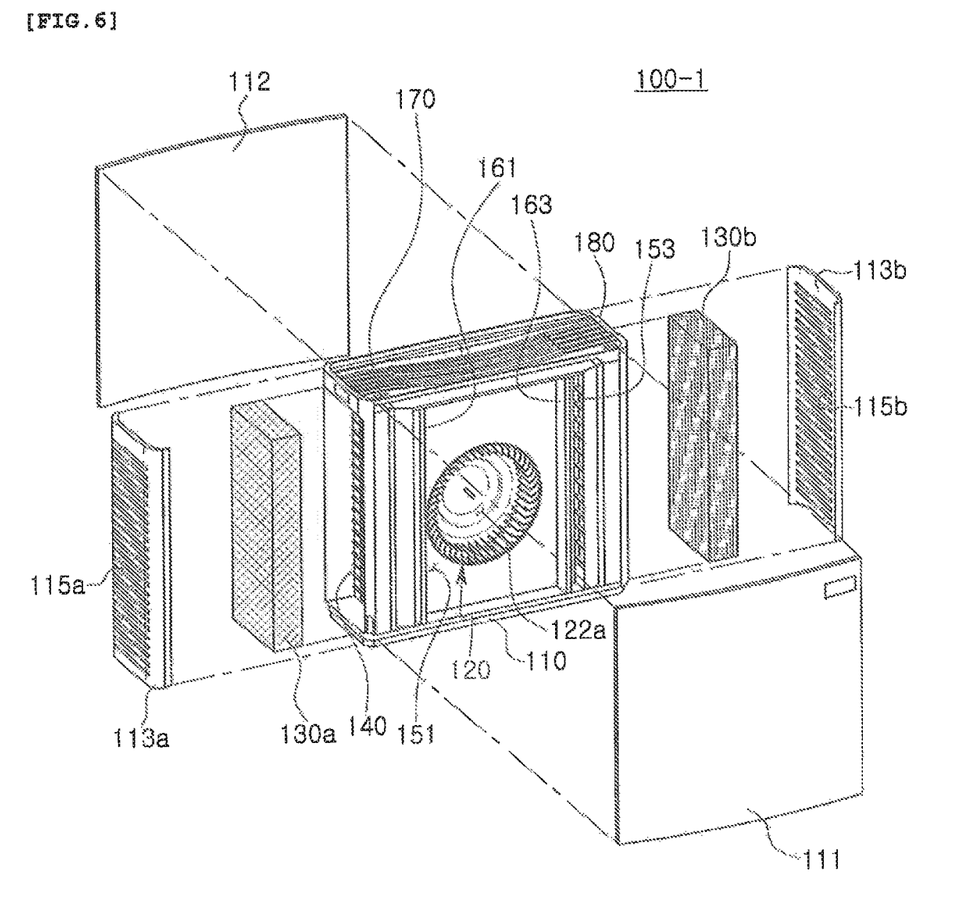
FIG. 6 is a front exploded perspective view in which a front surface cover, a rear surface cover, a filter cover, and an air processing part of a slim-type air processing device according to another exemplary embodiment are disassembled.
Figure 7:
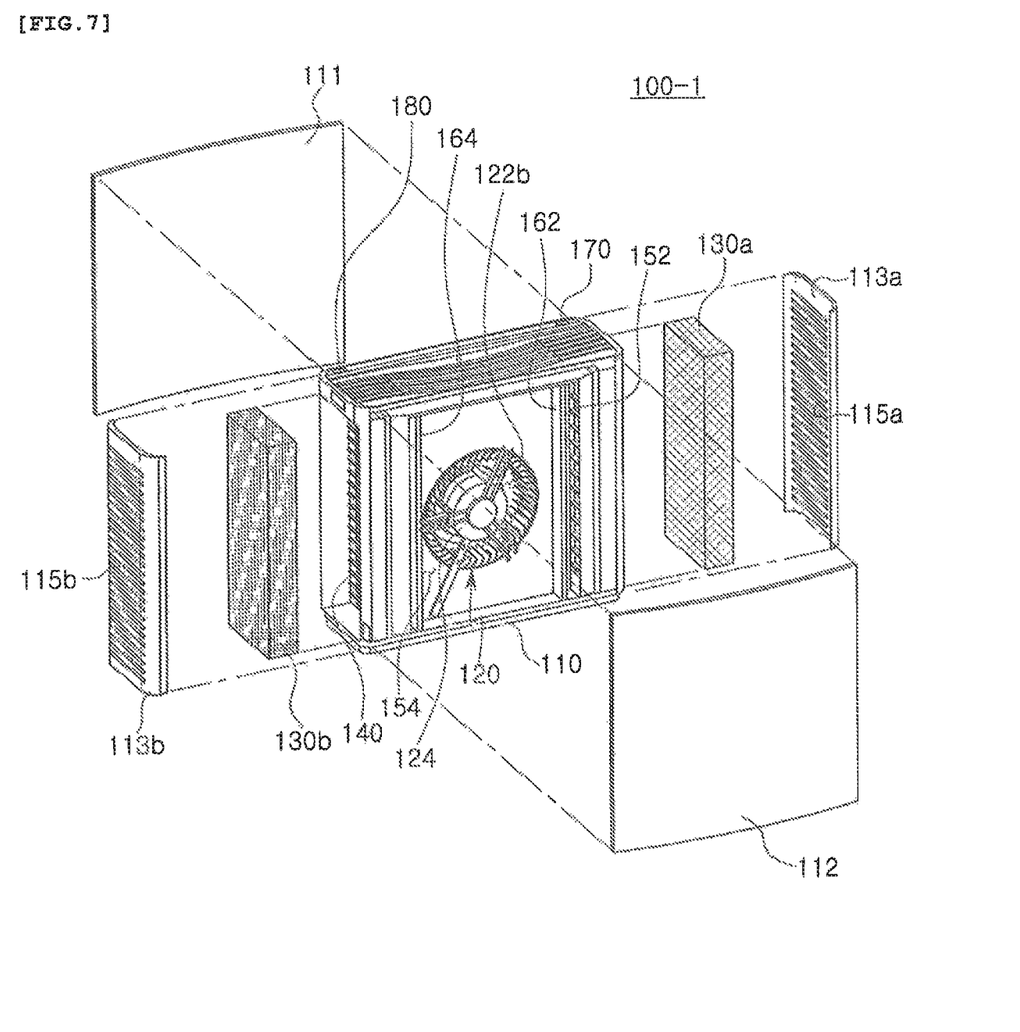
FIG. 7 is a rear exploded perspective view in which a front surface cover, a rear surface cover, a filter cover, and an air processing part of the slim-type air processing device illustrated in FIG. 6 are disassembled.

In addition, in the slim-type air processing device 100-1 according to another exemplary embodiment, the air processing part 130 may be configured to include a first filter 130a disposed in the first air suction part 115a and purifying air, and a second filter 130b disposed in the second air suction part 115b and purifying air.

Here, the first filter 130a and the second filter 130b may have different air purification functions.

In other words, in the slim-type air processing device 100 according to an exemplary embodiment described previously with reference to FIGS. 1 through 5, air processing parts 130, disposed in the first air suction part 115a and the second air suction part 115b, include filters, performing the same air purification function, while, in the slim-type air processing device 100-1 according to another exemplary embodiment illustrated in FIGS. 6 through 11, different filters may be disposed in the first air suction part 115a and the second air suction part 115b.

For example, the first filter 130a may include a deodorizing filter removing an odor and a gas in air, while the second filter 130b may include a HEPA filter removing fine dust and bacteria in air.

By means of a configuration described above, when the first opening and closing part 161 and the second opening and closing part 162 are open, a deodorization function may be performed by removing an odor and a gas in air as the air passes through the first filter 130a after the air is sucked through the first air suction part 115a.

In addition, when the third opening and closing part 163 and the fourth opening and closing part 164 are open, a dust collection and sterilization function may be performed by removing fine dust and bacteria in air as the air passes through the second filter 130b after the air is sucked into the second air suction part 115b.

Meanwhile, the slim-type air processing device 100-1 according to another exemplary embodiment may include a gas sensor 170 sensing a gas concentration of air outside of the housing 110, a dust sensor 180 sensing a dust concentration of air outside of the housing 110, and a control part (not shown) controlling a flow path opening and closing operation of the first opening and closing part 161, the second opening and closing part 162, the third opening and closing part 163, and the fourth opening and closing part 164.

In another exemplary embodiment described above, the control part may control a flow path opening and closing operation of the first opening and closing part 161, the second opening and closing part 162, the third opening and closing part 163, and the fourth opening and closing part 164 based on a value sensed by the gas sensor 170 and the dust sensor 180.

Figure 10:
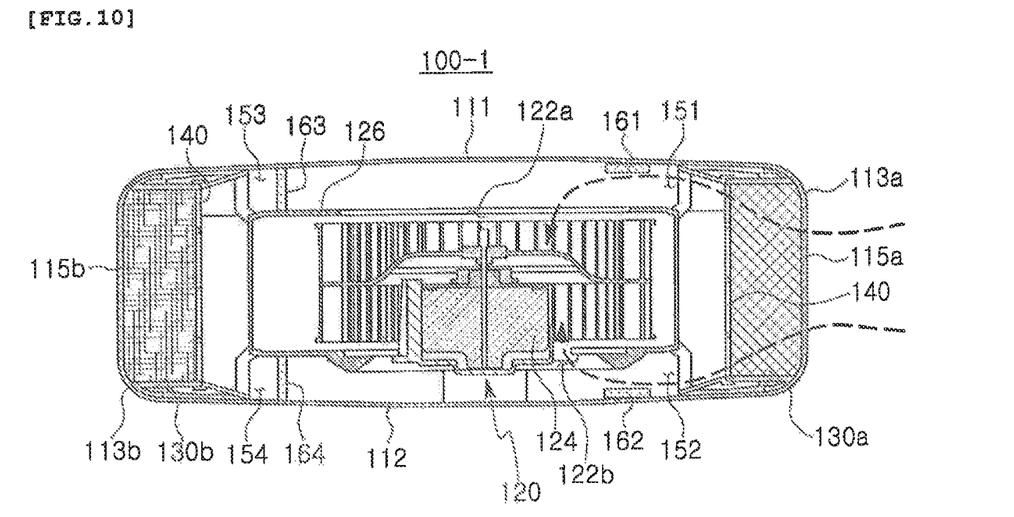
FIGS. 10 and 11 are plan cross-sectional views illustrating an operating state of the slim-type air processing device illustrated in FIG. 6.

For example, when a gas concentration, sensed by the gas sensor 170, is equal to or greater than a preset reference value, the control part may allow the first opening and closing part 161 and the second opening and closing part 162 to be opened, as illustrated in FIG. 10. When the first opening and closing part 161 and the second opening and closing part 162 are open, air is allowed to flow through the first flow path 151 and the second flow path 152, so indoor air may be purified through the first filter 130a including a deodorizing filter. Thus, an odor substance and gas in the indoor air may be removed.

Figure 11:
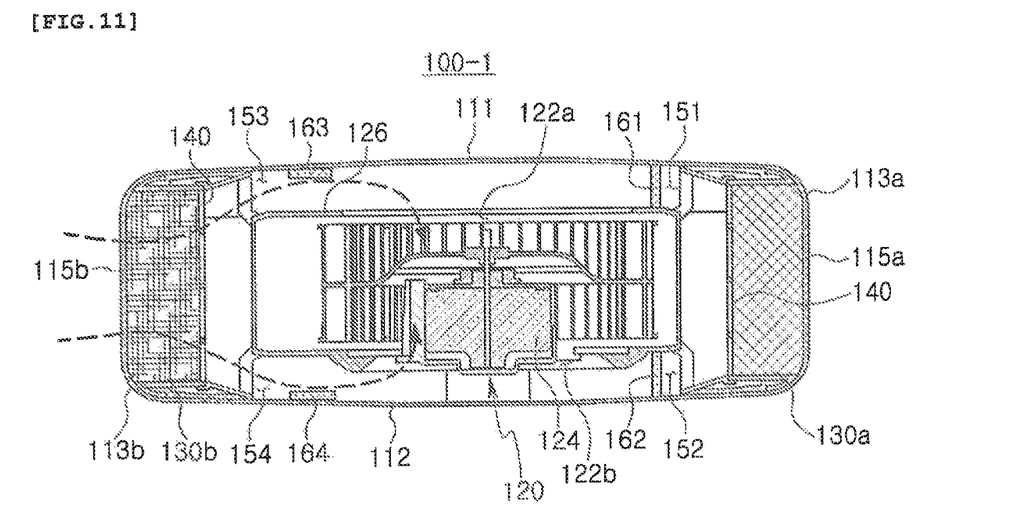

In addition, when a dust concentration, sensed by the dust sensor 180, is equal to or greater than a preset reference value, the control part may allow the third opening and closing part 163 and the fourth opening and closing part 164 to be opened, as illustrated in FIG. 11. When the third opening and closing part 163 and the fourth opening and closing part 164 are open, air is allowed to flow through the third flow path 153 and the fourth flow path 154, so indoor air may be purified through the second filter 130b including a HEPA filter. Thus, fine dust and bacteria in indoor air may be removed.

On the contrary, when the gas concentration, sensed by the gas sensor 170, is lower than a reference value, the control part may allow the first opening and closing part 161 and the second opening and closing part 162 to be closed. In this regard, when a concentration of an odor and a gas in indoor air is lower than a desired concentration, air flow to the first flow path 151 and the second flow path 152 is automatically blocked, so the use of the first filter 130a including a deodorizing filter may be stopped.

In addition, when the dust concentration, sensed by the dust sensor 180, is lower than a reference value, the control part may allow the third opening and closing part 163 and the fourth opening and closing part 164 to be closed. In this regard, when a concentration of dust and bacteria in indoor air is lower than a desired concentration, air flow to the third flow path 153 and the fourth flow path 154 is automatically blocked, so the use of the second filter 130b including a HEPA filter may be stopped.

In an exemplary embodiment, the control part may independently control each of the first opening and closing part 161, the second opening and closing part 162, the third opening and closing part 163, and the fourth opening and closing part 164, based on the gas concentration, sensed by the gas sensor 170, and the dust concentration, sensed by the dust sensor 180. In some cases, the first filter 130a and the second filter 130b may be used at the same time, or neither the first filter 130a nor the second filter 130b may be used.

Here, when neither the first filter 130a nor the second filter 130b is used, an indoor air quality means a desired air quality having been changed. In this case, when the control part allows the first opening and closing part 161, the second opening and closing part 162, the third opening and closing part 163, and the fourth opening and closing part 164 to be closed all, an operation of the centrifugal fan 120 may be automatically stopped.

Meanwhile, in an exemplary embodiment, when the gas concentration, sensed by the gas sensor 170, is equal to or greater than the preset risk value, the control part allows the first opening and closing part 161 and the second opening and closing part 162 to be opened, and allows the third opening and closing part 163 and the fourth opening and closing part 164 to be closed. Thus, a substantially entire amount of a suction air of the centrifugal fan 120 is allowed to pass through the first filter 130a, so a dust collection and sterilization function may be performed intensively.

On the contrary, when the dust concentration, sensed by the dust sensor 180, is equal to or greater than the preset risk value, the control part allows the third opening and closing part 163 and the fourth opening and closing part 164 to be opened, and allows the first opening and closing part 161 and the second opening and closing part 162 to be closed. Thus, a substantially entire amount of a suction air of the centrifugal fan 120 is allowed to pass through the second filter 130b, so a dust collection and sterilization function may be intensively performed.

The slim-type air processing device 100-1 according to another exemplary embodiment as described above may have the advantage in which the first filter 130a and the second filter 130b, having different air purification functions, are disposed in different air suction flow paths and each flow path is opened and closed, so different air purification functions may be selected as required, and the functions may be intensively performed.

In addition, the slim-type air processing device 100-1 according to another exemplary embodiment may have the advantage in which different filters are not disposed in the first inlet 122a and the second inlet 122b in both sides of the centrifugal fan 120, while the first filter 130a and the second filter 130b are disposed in a radial direction of the centrifugal fan 120 and air passing through the first filter 130a and the second filter 130b may be sucked into the first inlet 122a and the second inlet 122b in both sides of the centrifugal fan 120. Even when one among a plurality of filters, the first filter 130a and the second filter 130b, is blocked, a suction performance of the first inlet 122a and the second inlet 122b in both sides of the centrifugal fan 120 may be fully performed.

While the present disclosure has been shown and described with reference to exemplary embodiments thereof in particular, the present disclosure is not limited thereto. It will be readily apparent to those skilled in the art that various changes and modifications thereof may be made within the spirit and scope of the present disclosure, and therefore to be understood that such changes and modifications belong to the scope of the appended claims.

The invention claimed is:

1. A slim-type air processing device, comprising:
a housing;
a centrifugal fan provided inside the housing;
an air suction part formed in the housing; and
an air processing part mounted in the housing, disposed on a flow path of air flowing from the air suction part to the centrifugal fan, and processing air, passing therethrough, in a manner of at least one of dehumidification, humidification, and purification,
wherein the centrifugal fan is provided with a shaft parallel to a front-rear direction of the housing, and
the air suction part and the air processing part are provided on both sides of the housing, wherein the centrifugal fan includes a first inlet disposed toward a front surface of the housing and a second inlet disposed toward a rear surface of the housing, the air suction part includes a first air suction part formed in one side of the housing, and a second air suction part formed in the other side of the housing, and an interior of the housing is provided with a first flow path connected from the first air suction part of the housing to the first inlet of the centrifugal fan, a second flow path connected from the first air suction part of the housing to the second inlet of the centrifugal fan, a third flow path connected from the second air suction part of the housing to the first inlet of the centrifugal fan, and a fourth flow path connected from the second air suction part of the housing to the second inlet of the centrifugal fan, the slim-type air processing device further comprising:
- a first opening and closing part provided in the housing and configured to open and close the first flow path;
- a second opening and closing part provided in the housing and configured to open and close the second flow path;
- a third opening and closing part provided in the housing and configured to open and close the third flow path; and
- a fourth opening and closing part provided in the housing and configured to open and close the fourth flow path.

2. The slim-type air processing device of claim 1, wherein an empty space is formed between an inlet of the centrifugal fan and an inner wall of the housing opposing the inlet.

3. The slim-type air processing device of claim 1, wherein the air processing part includes an air purification filter.

4. The slim-type air processing device of claim 1, wherein the centrifugal fan is configured to draw in air on both sides of the housing.

5. The slim-type air processing device of claim 1, wherein an upper end of the housing is provided with an air discharge part from which air inside of the housing is discharged externally.

6. The slim-type air processing device of claim 1, further comprising:
- a gas sensor for sensing a gas concentration of air outside of the housing;
- a dust sensor for sensing a dust concentration of air outside of the housing; and
- a control part configured to control a flow path opening and closing operation of the first opening and closing part, the second opening and closing part, the third opening and closing part, and the fourth opening and closing part, based on a value sensed by the gas sensor and the dust sensor.

7. The slim-type air processing device of claim 6, wherein the air processing part includes a first filter disposed in the first air suction part and having a deodorizing filter, and a second filter disposed in the second air suction part and having a HEPA filter, and the control part allows the first opening and closing part and the second opening and closing part to be opened when a gas concentration, sensed by the gas sensor, is equal to or greater than a reference value, and allows the third opening and closing part and the fourth opening and closing part to be opened when a dust concentration, sensed by the dust sensor, is equal to or greater than a reference value.

8. The slim-type air processing device of claim 7, wherein the control part allows the first opening and closing part and the second opening and closing part to be closed when the gas concentration, sensed by the gas sensor, is lower than the reference value, and allows the third opening and closing part and the fourth opening and closing part to be closed when the dust concentration, sensed by the dust sensor, is lower than the reference value.

9. The slim-type air processing device of claim 7, wherein the control part allows the first opening and closing part and the second opening and closing part to be opened and the third opening and closing part and the fourth opening and closing part to be closed, when the gas concentration, sensed by the gas sensor, is equal to or greater than a preset reference value, and allows the first opening and closing part and the second opening and closing part to be closed and the third opening and closing part and the fourth opening and closing part to be opened, when the dust concentration, sensed by the dust sensor, is equal to or greater than a preset reference value.

10. The slim-type air processing device of claim 1, wherein the air processing part includes a first filter disposed in the first air suction part and purifying air and a second filter disposed in the second air suction part and purifying air, the first filter and the second filter having different air purification functions.

11. The slim-type air processing device of claim 10, wherein the first filter includes a deodorizing filter removing an odor in air and the second filter includes a high efficiency particulate air (HEPA) filter removing fine dust and bacteria in air.

* * * * *